United States Patent [19]

Tanaka et al.

[11] Patent Number: 4,856,815
[45] Date of Patent: Aug. 15, 1989

[54] VEHICLE SUSPENSION APPARATUS

[75] Inventors: Tadao Tanaka; Mitsuhiko Harara, both of Okazaki; Yasutaka Taniguchi, Nagoya; Shozo Takizawa; Minoru Tatemoto, both of Okazaki; Tetsuya Terada, Nagoya; Shunichi Wada, Himeji; Shigeki Ohtagaki, Himeji; Kouji Mitsuhata, Himeji, all of Japan

[73] Assignees: Mitsubishi Jidoshia Kogyo Kabushiki Kaisha; Mitsubhishi Denki Kabushiki Kaisha, both of Tokyo, Japan

[21] Appl. No.: 255,777

[22] Filed: Oct. 11, 1988

[30] Foreign Application Priority Data

Oct. 15, 1987 [JP] Japan .................. 62-260469

[51] Int. Cl.4 ............................................ B60G 11/26
[52] U.S. Cl. .................... 280/707; 200/6.12; 200/DIG. 1
[58] Field of Search .............. 280/707, 840, 6.11, 280/6.12, DIG. 1

[56] References Cited

U.S. PATENT DOCUMENTS

| | | | |
|---|---|---|---|
| 4,625,992 | 12/1986 | Tanaka et al. | 280/707 |
| 4,695,074 | 9/1987 | Kobayashi et al. | 280/707 |
| 4,696,483 | 9/1987 | Takizawa et al. | 280/DIG. 1 |
| 4,730,843 | 3/1988 | Tanaka et al. | 280/707 |

Primary Examiner—Kenneth R. Rice
Attorney, Agent, or Firm—Hedman, Gibson, Costigan & Hoare

[57] ABSTRACT

When vibrations having a period at which pitching tends to occur in a vehicle body is detected, if its amplitude falls out of the range between "H" and "L", a control unit increases the damping force of each suspension unit by using an actuator. In addition, if the amplitude falls out of the range between "HH" and "LL", the control unit supplies a predetermined amount of air to each air spring chamber in response to an upward displacement of vehicle height, and exhausts a predetermined amount of air from each air spring chamber in response to a downward displacement of vehicle height.

4 Claims, 5 Drawing Sheets

VEHICLE SUSPENSION APPARATUS

BACKGROUND OF THE INVENTION

1. Field of the Invention

The present invention relates to a vehicle suspension apparatus and, more particularly, to an improvement in suspension for reducing pitching occurring in a vehicle body during traveling.

2. Description of the Related Art

In a conventional suspension apparatus, if a vibration period input from a road surface is close to the natural frequency of suspension when a vehicle travels on a waved road having a long wave cycle, large pitching may occur in the vehicle, or adjustment of the vehicle position becomes difficult. Therefore, a suspension apparatus which can reduce pitching occurring in the vehicle body is proposed. This apparatus comprises suspension units interposed between wheels and a vehicle body and having fluid spring chambers, a fluid supply unit for supplying a fluid to the fluid spring chambers through supply valves, a fluid exhaust unit for exhausting a fluid from the fluid spring chambers through exhaust valves, a vehicle height sensor for detecting a distance between the wheels and the vehicle body, and a control unit for controlling the supply and exhaust valves. With this arrangement, the control unit is designed to open the supply valves for a set or predetermined time in response to an upward displacement of vehicle height and to open the exhaust valves for a predetermined time in response to a downward displacement of vehicle height when a vibration period of vehicle height detected by the vehicle height sensor falls within a predetermined range with respect to a reference vehicle height as the center of the range and its amplitude is larger than a predetermined value, thereby reducing pitching occurring in the vehicle body.

In this apparatus, however, if a threshold value used for performing control for reducing pitching is set to be excessively small, since compressed air is consumed every control operation, the operation frequency of a compressor or pump serving as the fluid supply unit or the number of times of actuation of the supply and exhaust valves is increased. Therefore, durability of each component is inevitably degraded. In contrast to this, if the threshold is set to be excessively large, even intermediate-level pitching cannot be reduced.

SUMMARY OF THE INVENTION

It is an object of the present invention to provide a vehicle suspension apparatus which can effectively reduce pitching from relatively small pitching to large pitching without degrading durability of each component.

According to the present invention, there is provided a vehicle suspension apparatus comprising suspension units interposed between wheels and a vehicle body and having fluid spring chambers, fluid supply means for supplying a fluid to the fluid spring chambers through supply valves, fluid exhaust means for exhausting a fluid from the fluid spring chambers through exhaust valves, changing means for changing a damping force of shock absorbers arranged on the suspension units, a vehicle height sensor for detecting a distance between the wheels and the vehicle body, and a control means for outputting a first control signal to increase the damping force by using the changing means when a vibration period of vehicle height detected by the vehicle height sensor falls within a predetermined range with respect to a reference vehicle height as the center of the range and if an amplitude of the vibrations exceeds a first predetermined value, and outputting a second control signal to increase the damping force by using the changing means while opening the supply valves for a predetermined time in response to an upward displacement of vehicle height and open the exhaust valves for a predetermined time in response to a downward displacement of vehicle height when the amplitude exceeds a second predetermined value larger than the first predetermined value.

According to the present invention, the damping force of the shock absorber is increased in response to relatively small pitching, and a fluid is controlled to be supplied/exhausted to/from the fluid spring chambers in response to larger pitching. With this operation, pitching from relatively small pitching to large pitching can be effectively reduced. In addition, since the operation frequency of compressor or pump and the number of times of action of each valve can be decreased, durability of each component can be improved.

DETAILED DESCRIPTION OF THE PREFERRED EMBODIMENTS

An embodiment of the present invention will be described below with reference to the accompanying drawings.

Figure 1:
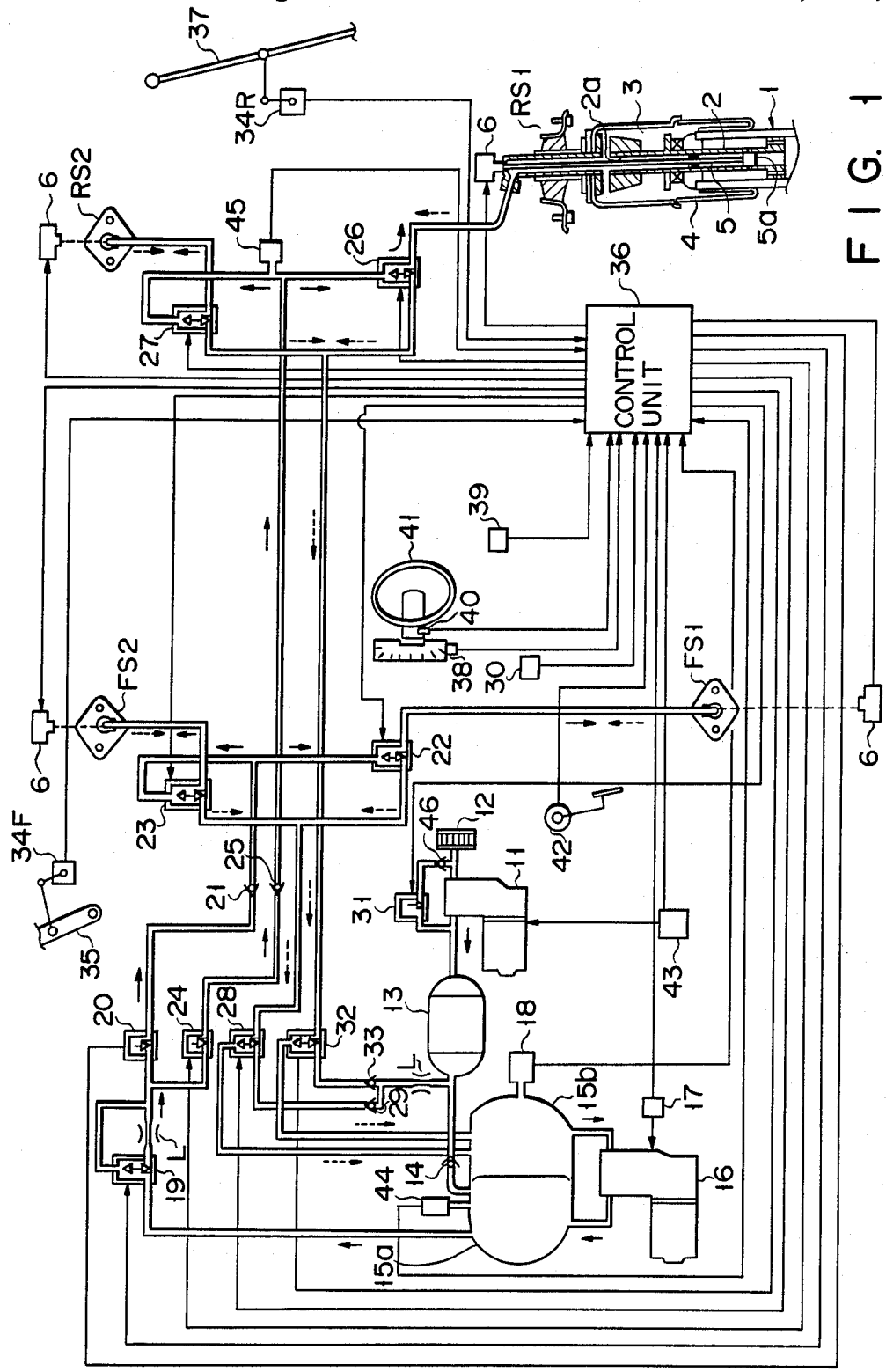
FIG. 1 is a view showing an overall arrangement of an embodiment of the present invention.

Referring to FIG. 1, reference symbol FS1 denotes a suspension unit at the front left wheel side; FS2, a suspension unit at the front right wheel side; RS1, a suspension unit at the rear left wheel side; and RS2, a suspension unit at the rear right wheel side. Since suspension units FS1, FS2, RS1, and RS2 have the same structure, the suspension unit will be represented by reference symbol S hereinafter except that the suspensions for front and rear wheels or left and right wheels are independently explained.

Suspension unit S includes shock absorber 1. Absorber 1 includes a cylinder mounted on a wheel and piston rod 2 having a piston slidably fitted in the cylinder and supported on a vehicle body at its upper end. Unit S includes air spring chamber 3 formed coaxially with rod 2 above absorber 1 and having a vehicle height adjusting function. Part of chamber 3 is formed by bellows 4. Therefore, by supplying/exhausting air to/from chamber 3 through path 2a formed in rod 2, the vehicle height can be increased or decreased.

Control rod 5 having valve 5a for adjusting a damping force at its lower end is arranged in piston rod 2. Control rod 5 is rotated by actuator 6 mounted at the upper end of piston rod 2 to drive valve 5a.

Compressor 11 compresses air fed from air cleaner 12 and supplies the air to high-pressure reserve tank 15a through dryer 13 and check valve 14. That is, since compressor 11 compresses air fed from cleaner 12 and supplies the air to dryer 13, the compressed air dried by silica gel or the like in dryer 13 is received in tank 15a. An inlet port of compressor 16 is connected to low-pressure reserve tank 15b, and its outlet port is connected to high-pressure reserve tank 15a. Reference numeral 18 denotes a pressure switch which is turned on when the pressure in tank 15b exceeds a first set value (e.g., the atmospheric pressure). When switch 18 outputs an ON signal, compressor 16 is driven by compressor relay 17 which is turned on by a signal from control unit 36 (to be described later). Therefore, the pressure in tank 15b is always maintained below the first set value.

Air is supplied from tank 15a to each suspension unit S as indicated by solid arrows in FIG. 1. That is, the compressed air in tank 15a is supplied to suspension units FS1 and FS2 through supply flow amount control valve 19, front supply solenoid valve 20, check valve 21, front left solenoid valve 22, and front right solenoid valve 23. Similarly, the compressed air in tank 15a is supplied to suspension units RS1 and RS2 through control valve 19, rear supply solenoid valve 24, check valve 25, rear left solenoid valve 26, and rear right solenoid valve 27. Note that supply flow amount control valve 19 can be set to a first position (ON state) where the compressed air to be supplied to each suspension unit S passes through small-diameter path L or to a second position (OFF state) where the air passes through a large-diameter path.

Air is exhausted from each unit S as indicated by broken arrows in FIG. 1. That is, the compressed air in units FS1 and FS2 is exhausted to tank 15b through solenoid valves 22 and 23 and exhaust direction change valve 28 comprising a three-way valve or is exhausted in the atmosphere through solenoid valves 22 and 23, change valve 28, check valve 29, dryer 13, exhaust solenoid valve 31, check valve 46 and air cleaner 12. Similarly, the compressed air in units RS1 and RS2 is exhausted to tank 15b through solenoid valves 26 and 27 and exhaust direction change valve 32 or is exhausted in the atmosphere through solenoid valves 26 and 27, change valve 32, check valve 33, dryer 13, exhaust solenoid valve 31, check valve 46, and air cleaner 12. Note that small-diameter path L having a diameter which is smaller than a diameter of paths connecting change valves 28 and 32 to tank 15b is formed between check valves 29 and 33 and dryer 13.

Figure 2A:
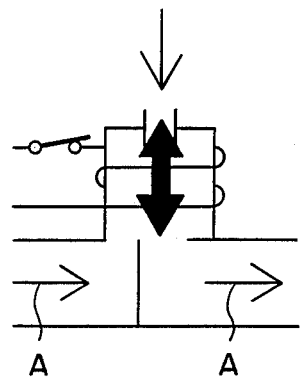
FIGS. 2A and 2B are views illustrating an operation of each three-way valve in FIG. 1.
Figure 2B:
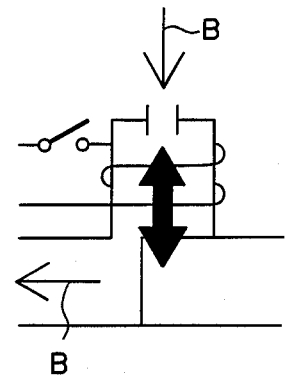
Figure 3A:
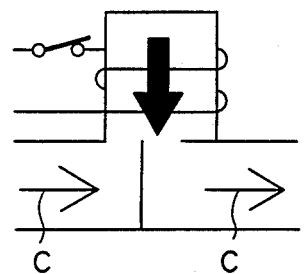
FIGS. 3A and 3B are views illustrating an operation of each switching valve in FIG. 1.
Figure 3B:
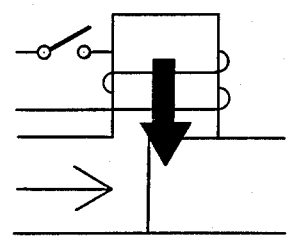

Each of solenoid valves 19, 22, 23, 26, 27, 28, and 32 allows an air flow indicated by arrows A in FIG. 2A when it is ON (energized) and allows an air flow indicated by arrows B in FIG. 2B when it is OFF (deenergized). Each of valves 20, 24, and 31 allows an air flow as indicated by arrows C in FIG. 3A when it is ON (energized) and inhibits an air flow as shown in FIG. 3B when it is OFF (deenergized).

Reference numeral 34F denotes a front vehicle height sensor, mounted between lower arm 35 of the front right suspension of the vehicle and the vehicle body, for detecting a front vehicle height; and 34R, a rear vehicle height sensor, mounted between lateral rod 37 of the rear left suspension of the vehicle and the vehicle body, for detecting a rear vehicle height. Various types of known sensors may be employed as the vehicle height sensor. In this embodiment, a sensor of a type which can detect nine stages of vehicle height from the maximum height to the minimum height, i.e., EH, HH, H, NH, N (normal), NL, L, LL, EL is employed. Signals detected by sensors 34F and 34R are supplied to control unit 36. Note that control unit 36 comprises a microcomputer, memories, a timer, an output circuit for driving valves, and an input circuit for reading outputs from switches and sensors (all of which are not shown).

Reference numeral 38 denotes a vehicle velocity sensor, incorporated in a speedometer, for supplying a detected vehicle velocity signal V to unit 36; 39, an acceleration sensor for detecting an acceleration acting on a vehicle body and supplying a detected acceleration signal to unit 36; 30, a brake switch (BSW) serving as a brake operation sensor for detecting the depressed state of a brake pedal (not shown), which is turned on when the brake pedal is depressed; 40, a steering wheel sensor for detecting the rotational speed of steering wheel 41, i.e., a steering angular velocity; and 42, an accelerator opening sensor for detecting the depression angle of an accelerator pedal for an engine (not shown). Signals detected by sensors 30, 40, and 42 are supplied to control unit 36. Reference numeral 43 denotes a compressor relay, controlled by a control signal from control unit 36, for driving compressor 11; and 44, a pressure switch which is turned on when the pressure in high-pressure reserve tank 15a is reduced below a second set value (e.g., 7 kg/cm$^2$). A signal from switch 44 is supplied to unit 36. When the pressure in tank 15a is reduced below the set value and pressure switch 44 is turned on, control unit 36 outputs a signal to compressor relay 43 so as to drive compressor 11. With this operation, the pressure in tank 15a is always maintained above the second set value. Note that even if pressure switch 44 is turned on, unit 36 inhibits driving of compressor 11 when pressure switch 18 is kept on, i.e., compressor 16 is kept driven. Reference numeral 45 denotes a pressure sensor, arranged in a path connecting solenoid valves 26 and 27, for detecting internal pressures of rear suspension units RS1 and RS2.

Each of solenoid valves 19, 20, 22, 23, 24, 26, 27, 28, 31, and 32 is controlled in accordance with a control signal from control unit 36.

An operation of the apparatus having the above arrangement according to the embodiment will be described below.

This apparatus has a vehicle height adjusting function and a position control function.

The vehicle height adjusting function for adjusting a vehicle height will be described first.

Control unit 36 compares vehicle heights detected by vehicle height sensors 34F and 34R with target vehicle heights set in the memory of unit 36. If it determines that each detected vehicle height is larger than the corresponding target vehicle height, it turns on solenoid valves 22, 23, 26, and 27, exhaust solenoid valve 31, and exhaust direction change valve 32 to lower the vehicle height. When unit 36 determines that the vehicle height is smaller than the target vehicle height, it turns on flow amount control valve 19 and supply solenoid valves 20 and 24 to increase the vehicle height.

The position control function for suppressing changes in position of the vehicle will be described below.

When steering wheel 41 is steered clockwise, the vehicle body tends to roll counterclockwise. In response to this operation, control unit 36 keeps supply solenoid valves 20 and 24 ON for a set time, and at the same time, turns on right-wheel solenoid valves 23 and 27 and turns on exhaust direction change valve 28, 32 after the set time has elapsed. With this operation, a set amount of compressed air is supplied from high-pressure reserve tank 15a to air spring chambers 3 of suspension units FS1 and RS1 on the left side, and a set amount of compressed air is exhausted from air spring chambers 3 of suspension units FS2 and RS2 on the right side to low-pressure reserve tank 15b. As a result, displacement of the vehicle, i.e., a counterclockwise roll is suppressed. This state, i.e., the state wherein a set amount of compressed air is supplied to air spring chambers 3 of suspension units FS1 and RS1 on the left side while a set amount of compressed air is exhausted from air spring chambers 3 of suspension units FS2 and RS2 on the right side is maintained. When turning is shifted to straight traveling, and control unit 36 detects that steering is set neutral by using steering sensor 40 or detects that a lateral acceleration becomes small by using acceleration sensor 39, unit 36 turns off solenoid valves 23 and 27. At the same time, unit 36 turns off exhaust direction change valve 28, 32. With this operation, the pressures in the air spring chambers of the respective suspension units on the right and left sides are kept to be equal to each other as in the case before the control is started.

When steering wheel 41 is steered counterclockwise, the vehicle body tends to roll clockwise. In response to this operation, unit 36 keeps supply solenoid valves 20 and 24 ON for a set time, and at the same time, turns on left-wheel solenoid valves 22 and 26. In addition, after the set time has elapsed, unit 36 turns on change valve 32. As a result, a set amount of compressed air is supplied from high-pressure reserve tank 15a to air spring chambers 3 of suspension units FS2 and RS2 on the right side, and at the same time, a set amount of compressed air is exhausted from air spring chambers 3 of suspension units FS1 and RS1 on the left side to low-pressure reserve tank 15b. With this operation, the displacement of the vehicle, i.e., a clockwise roll, is suppressed. Subsequently, the vehicle is controlled in the same manner as in the case wherein steering wheel 41 is steered clockwise.

An operation of position control for suppressing a squat will be described. A squat is a phenomenon in which a front portion of a vehicle floats while its rear portion sinks when the vehicle is started/accelerated because of an acceleration acting on the vehicle body. When it is detected that the vehicle is quickly accelerated by using accelerator opening sensor 42 or acceleration sensor 39, unit 36 turns on solenoid valve 4 for a set time, and at the same time, turns off front wheel solenoid valves 22 and 23. In addition, after the set time has elapsed, unit 36 turns on change valve 28. As a result, a set amount of compressed air is exhausted from front-wheel suspension units FS1 and FS2 to tank 15b, and at the same time, a set amount of compressed air is supplied from tank 15a to rear-wheel suspension units RS1 and RS2. The squat is controlled in this manner. This state is continued until the acceleration is decreased. When unit 36 detects that the quick acceleration is decreased by using accelerator opening sensor 42, acceleration sensor 39, or the like after this operation, control unit 36 keeps supply solenoid valve 20 and rear-wheel solenoid valves 26 and 27 ON for a set time, and at the same time, turns off front-wheel solenoid valves 22 and 23. As a result, a set amount of compressed air is supplied from tank 15a to front-wheel suspension units FS1 and FS2 while a set amount of compressed air is exhausted from rear-wheel suspension units RS1 and RS2 to tank 15b. With this operation, the air spring chambers of the respective suspension units S are returned to the state before the control is started.

An operation of position control for suppressing a nose dive will be described below. A nose dive is a phenomenon in which a front portion of a vehicle sinks upon braking because of a negative acceleration acting on the vehicle body. When acceleration sensor 39 detects that a negative acceleration upon braking or the like exceeds a predetermined value, control unit 36 keeps supply solenoid valve 20 ON for a predetermined time, and turns on rear-wheel solenoid valves 26 and 27. In addition, after the predetermined time has elapsed, unit 36 turns on exhaust direction change valve 32. With this operation, a predetermined amount of compressed air is supplied from high-pressure reserve tank 15a to front-wheel suspension units FS1 and FS2, and a predetermined amount of compressed air is exhausted from rear-wheel suspension units RS1 and RS2 to low-pressure reserve tank 15b. The nose dive can be suppressed in this manner. This state is continued until the negative acceleration is decreased. When sensor 39 detects that the negative acceleration is decreased, unit 36 keeps supply solenoid valve 24 and front-wheel solenoid valves 22 and 23 ON for a predetermined time, and turns off rear-wheel solenoid valves 26 and 27. With this operation, a predetermined amount of compressed air is exhausted from front-wheel suspension units FS1 and FS2 to tank 15b, and a predetermined amount of compressed air is supplied from tank 15a to rear-wheel suspension units RS1 and RS2. In this manner, the air spring chambers of the respective suspension units S are returned to the state before the control is started.

Figure 4A:
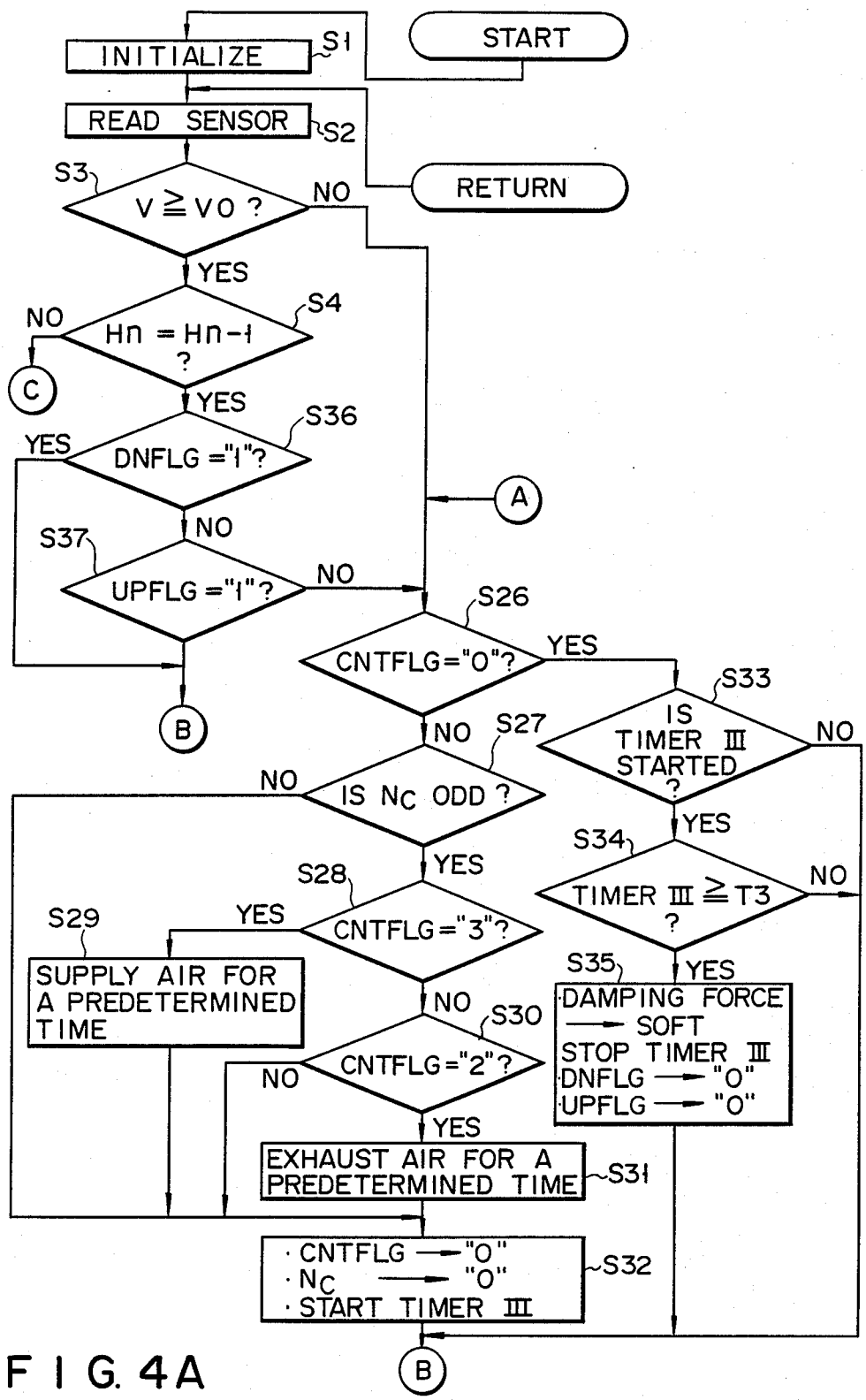
FIGS. 4A and 4B are flow charts for explaining an operation of control unit 36 in FIG. 1.
Figure 4B:
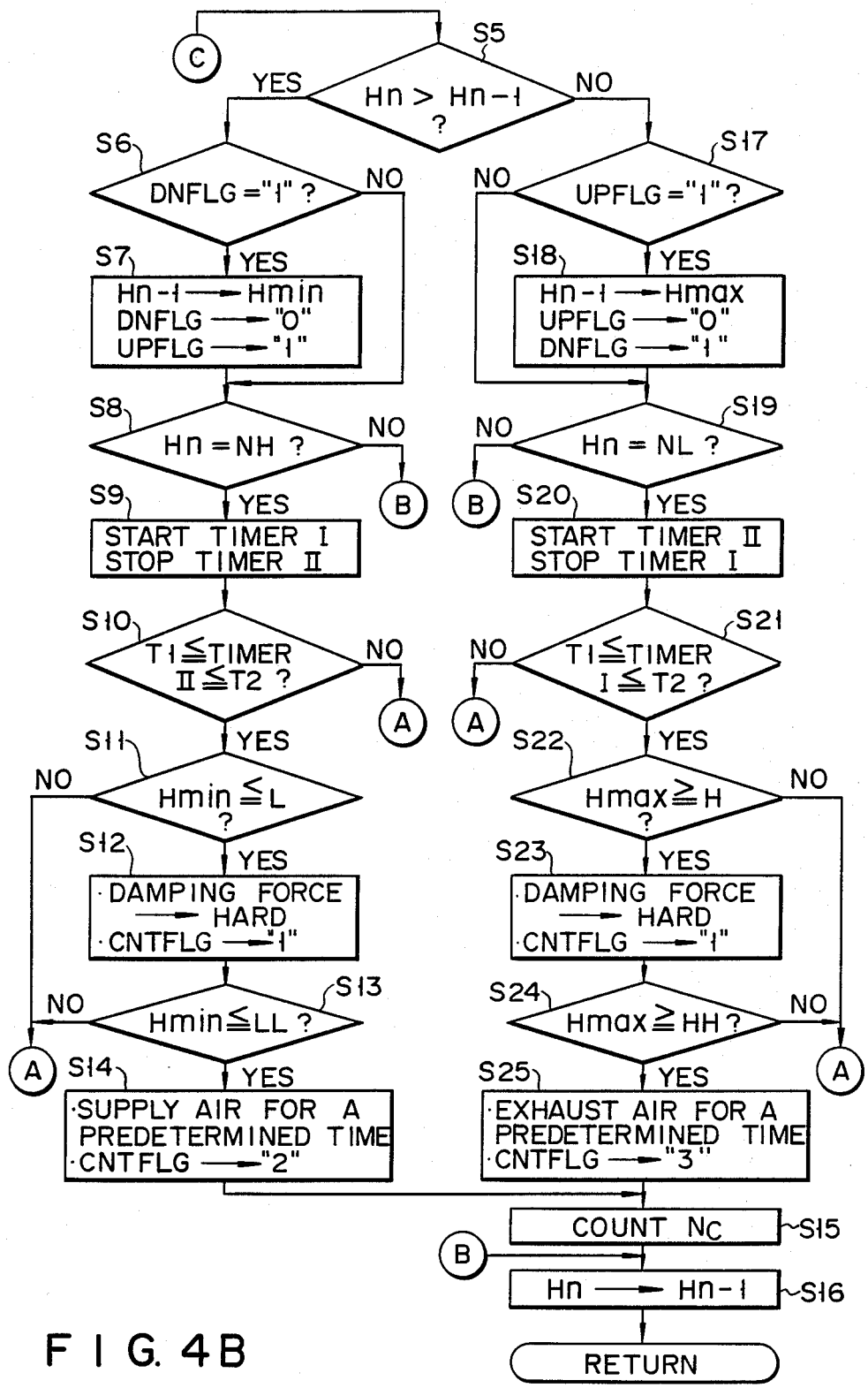

A control sequence for reducing pitching occurring in the vehicle body when the vehicle travels on a waved road having a long wave cycle will be described below. According to this control sequence, control unit 36 always monitors changes in vehicle height, and increases the damping force of each shock absorber when a variation period of vehicle height falls within a predetermined range with respect to a reference vehicle height as the center of the range, and its amplitude is larger than "H" or smaller than "L". In addition, when the amplitude at this time is larger than "HH" or smaller than "LL", a predetermined amount of air is supplied to the air spring chambers in response to an upward displacement of vehicle height, whereas a predetermined amount of air is exhausted from the air spring chambers in response to a downward displacement of vehicle height. Processing performed by control unit 36 will be described in detail with reference to flow charts in FIGS. 4A and 4B. Note that the flow charts shown in FIGS. 4A and 4B are used to described supply/exhaust control of front-wheel suspension units FS1 and FS2. Although a description of rear-wheel suspension units RS1 and RS2 will be omitted, they are controlled in the same manner as in the flow charts shown in FIGS. 4A and 4B by using detection signals from vehicle height sensor 34R.

In step S1, control unit 36 performs initialization, i.e., clears each memory and flag, and resets each timer. In step S2, an output from each sensor is read, i.e., detection signals from vehicle velocity sensor 38 and vehicle height sensor 34F are read, and are stored in a predetermined memory incorporated in unit 36. It is judged in step S3 whether vehicle velocity V exceeds predetermined vehicle velocity Vo (e.g., 30 km/h). If "YES" is obtained in step S3, the flow advances to step S4 to judge whether currently detected vehicle height $H_n$ is equal to previously detected vehicle height $H_{n-1}$. Note that control unit 36 repeatedly performs processing in the flow charts shown in FIGS. 4A and 4B in a very short cycle (e.g., 6 msec), and that a value read in step S2 in the preceding cycle is stored in the predetermined memory as previously detected vehicle height $H_{n-1}$. If "NO" is obtained in step S4, i.e., it is detected that a change in vehicle height occurs, the flow advances to step S5 to judge whether vehicle height $H_n$ exceeds vehicle height $H_{n-1}$. If "YES" is obtained in step S5, the flow advances to step S6 to judge whether "1" is set in a predetermined memory as downward flag DNFLG. Note that downward flag DNFLG is set at "1" when vehicle height $H_n$ is below vehicle height $H_{n-1}$, and is set at "0" when vehicle height $H_n$ exceeds vehicle height $H_{n-1}$. If "YES" is obtained in step S6, i.e., it is judged that the vehicle height which has been decreased starts to increase, the flow advances to step S7, so that vehicle height $H_{n-1}$ is stored in a predetermined memory as minimum vehicle height Hmin, and "0" and "1" are set a predetermined memory as downward and upward flags DNFLG and UPFLG, respectively.

When processing in step S7 is completed, or if "NO" is obtained in step S6, the flow advances to step S8 to judge whether vehicle height $H_n$ is "NH". If "YES" is obtained in step S8, the flow advances to step S9 to start timer I incorporated in unit 36 and stop timer I1. Then, the flow advances to step S10 to judge whether a time counted by timer II falls within a predetermined range, i.e., between T1 and T2 seconds. T1 and T2 defining the predetermined range are set to be close to values of the natural frequency of suspension, i.e., values at which resonance tends to occur.

If "YES" is obtained in step 10, the flow advances to step S11 to judge whether vehicle height Hmin is smaller than "L". If "YES" is obtained in step S11, the flow advances to step S12 to output a control signal for increasing the damping force of actuator 6 and set "1" in a predetermined memory as control flag CNTFLG. Then, the flow advances to step S13 to judge whether vehicle height Hmin is smaller than "LL". If "YES" is obtained in step S13, the flow advances to step S14 to output a control signal for opening front supply solenoid valve 20 for a predetermined time and set "2" in a predetermined memory as control flag CNTFLG. When processing in step S14 is completed, the flow advances to step S15, and number NC of control cycles is counted and stored in a predetermined memory. In step S16, vehicle height $H_n$ is stored in a predetermined memory as vehicle height $H_{n-1}$. When processing in step S16 is completed, the flow returns to step S2.

In contrast to the above operation, if "NO" is obtained in step S5, the flow advances to step S17 to judge whether "1" is set in a predetermined memory as upward flag UPFLG. Note that upward flag UDFLG is set at "1" when vehicle height H exceeds vehicle height $H_{n-1}$, and is set at "0" when vehicle height $H_n$ is smaller than vehicle height $H_{n-1}$. If "YES" is obtained in step 17, i.e., it is judged that the vehicle height which has been increased starts to decrease, the flow advances to step S18. In step S18, vehicle height $H_{n-1}$ is stored in a predetermined memory as maximum vehicle height Hmax, and "0" and "1" are set in a predetermined memory as upward and downward flags UPFLG and DNFLG, respectively.

When processing in step S18 is completed, or if "NO" is obtained in step S17, the flow advances to step S19 to judge whether vehicle height $H_n$ is "NL". If "YES" is obtained in step S19, the flow advances to step S20 to start internal timer II and stop timer I. Then, the flow advances to step S21 to judge whether a time counted by timer I falls within in a predetermined range, i.e., between T1 and T2 seconds.

If "YES" is obtained in step S21, the flow advances to step S22 to judge whether vehicle height Hmax exceeds "H". If "YES" is obtained in step S22, the flow advances to step S23 to output a control signal for increasing the damping force of actuator 6 and set "1" in a predetermined memory as control flag CNTFLG. Then, the flow advances to step S24 to judge whether vehicle height Hmax is larger than "HH". If "YES" is obtained in step S24, the flow advances to step S25 to output a control signal for opening front solenoid valves 22 and 23 for a predetermined time and set "3" in a predetermined memory as control flag CNTFLG. When processing in step S25 is completed, the flow advances to step S15. Note that if "NO" is obtained in step S8 or S19, the flow advances to step S16.

If "NO" is obtained in step S3, i.e., if it is judged that vehicle velocity V is below predetermined vehicle velocity Vo, the flow advances to step S26 to judge whether "0" is set as control flag CNTFLG. If "NO" is obtained in step S26, i.e., if it is judged that control is executed in one of steps S12, S14, S23, and S25, the flow advances to step S27 to judge whether stored number NC of control cycles is an odd number. If "YES" is obtained in step S27, the flow advances to step S28 to judge whether control flag CNTFLG is set at "3". If "YES" is obtained in step S28, the flow advances to step S29 to output a control signal for keeping valve 20 ON for a predetermined time (e.g., 0.2 seconds). If "NO" is obtained in step S28, the flow advances to step S30 to judge whether control flag CNTFLG is set at "2". If "YES" is obtained in step S30, the flow advances to step S31 to output a control signal for keeping valves 22 and 23 ON for a predetermined time (e.g., 0.2 seconds). When number NC of control cycles is counted up to an odd number in this manner, the state of each air spring chamber 3 can be restored to a state prior to the control by processing in step S29 or S31. When processing in step S29 or S31 is completed, or if "NO" is obtained in step S27 or S30, the flow advances to step S32. In step 32, "0"s are respectively set in a predetermined memory as control flag CNTFLG and number NC of control cycles, and internal timer III is started. When processing in step S32 is completed, the flow advances to step S16.

If "YES" is obtained in step S26, the flow advances to step S33 to judge whether timer III is started. If "YES" is obtained in step S33, the flow advances to step S34 to judge whether a time counted by timer III exceeds predetermined time T3 (e.g., 2.0 seconds). If "YES" is obtained in step S34, the flow advances to step S35. In step S35, unit 36 outputs a control signal for decreasing the damping force of actuator 6, stops timer III, and sets "0"s in a predetermined memory as downward and upward flags DNFLG and UPFLG. When processing in step S35 is completed, the flow advances to step S16. Note that if "NO" is obtained in step S33 or S34, the flow also advances to step S16. Even after the supply/exhaust control is performed to restore the initial state, the damping force is kept at high level (hard) for a predetermined time.

If "YES" is obtained in step S4, i.e., if it is judged that vehicle height $H_n$ is equal to vehicle height $H_{n-1}$, the flow advances to step S36 to judge whether "1" is set as downward flag DNFLG. If "NO" is obtained in step S36, the flow advances to step S37 to judge whether "1" is set as upward flag UPFLG. If "NO" is obtained in step S37, the flow advances to step S26. If "YES" is obtained in step S36 or S37, the flow advances to step S16.

Figure 5:
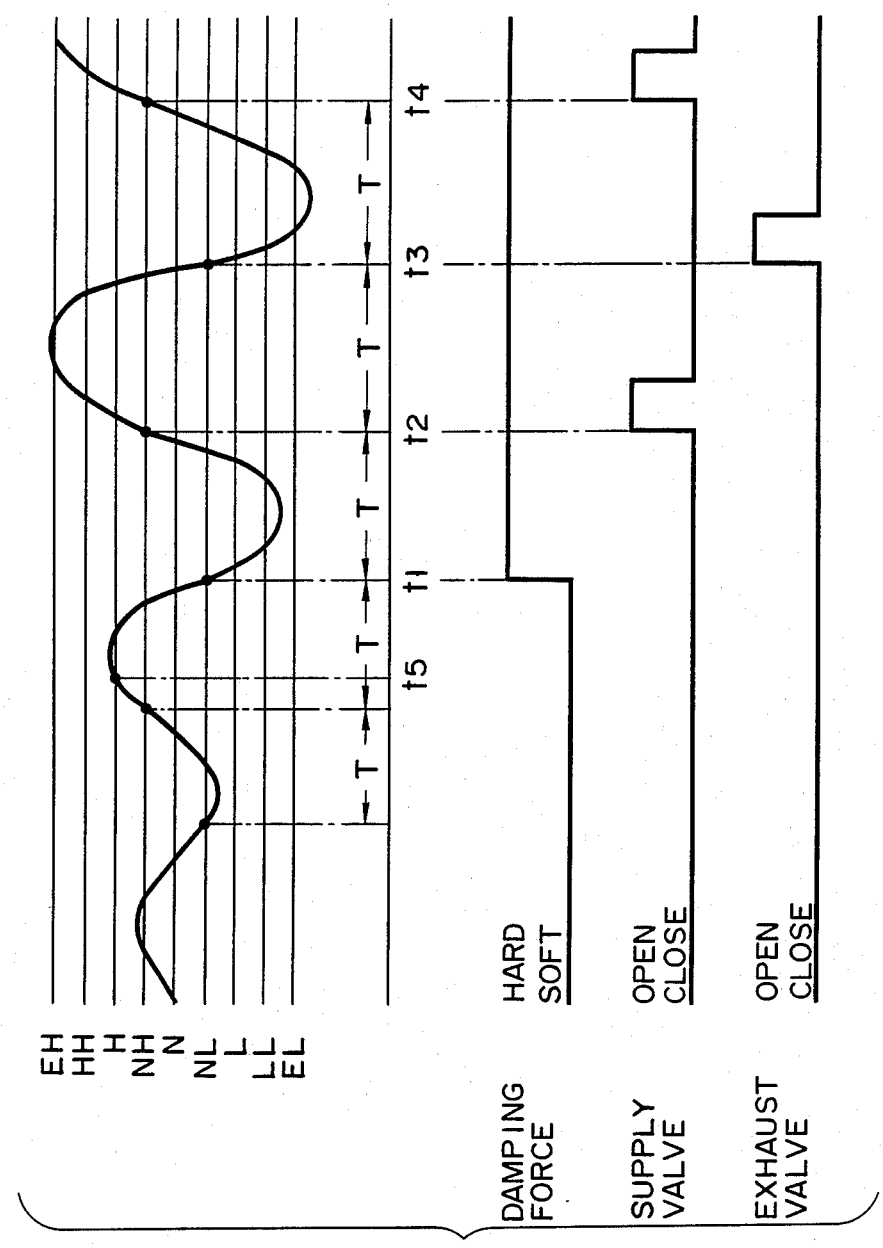
FIG. 5 is a view illustrating a detailed example of control.

As is apparent from the above description, according to the present invention, when a vibration period at which pitching tends to occur in the vehicle body is detected, if its amplitude falls out of the range between "H" and "L", control unit 36 increases the damping force of each suspension unit by using actuator 6. In addition, if the amplitude falls out of the range between "HH" and "LL", unit 36 supplies a predetermined amount of air to each air spring chamber 3 in response to an upward displacement of vehicle height, and exhausts a predetermined amount of air from each air spring chamber 3 in response to a downward displacement of vehicle height. According to a detailed example of control shown in FIG. 5, when period T of vehicle height vibration falls within a predetermined range, and the amplitude falls out of the range between "H" and "L", the damping force is increased when (at time t1) vehicle height "NL" is detected during a downward displacement of vehicle height or vehicle height "NH" is detected during a upward displacement of vehicle height. In addition, when the amplitude falls out of the range between "HH" and "LL", the air supply control is executed for a predetermined time when (at time t2 or t4) vehicle height "NH" is detected during the upward displacement of vehicle height, while the air exhaust control is executed when (at time t3) vehicle height "NL" is detected during the downward displacement of vehicle height.

According to the embodiment, therefore, the damping force of shock absorber 1 is increased in response to relatively small pitching, whereas air is controlled to be supplied/exhausted to/from each air spring chamber 3 in response to larger pitching, thereby effectively reducing pitching from relatively small pitching to large pitching. In addition, since the operation frequency of compressor 16 and the number of times of actuation of each valve can be decreased, durability of each component can be improved.

Note that in the above-described embodiment, the damping force is increased at time t1. However, if period T of vehicle vibration falls within the predetermined range, the damping force may be increased when (time t5) the vehicle height falls out of the range between "H" and "L".

In addition, in the above embodiment, air is used as a working fluid. However, the present invention can be easily applied to a suspension apparatus of a hydropneumatic type suspension using a liquid as a working fluid.

What is claimed is:

1. A vehicle suspension apparatus comprising: suspension units interposed between wheels and a vehicle body and having fluid spring chambers;
   fluid supply means for supplying a fluid to said fluid spring chambers through supply valves;
   fluid exhaust means for exhausting the fluid from said fluid spring chambers through exhaust valves;
   changing means for changing a damping force of shock absorbers arranged on said suspension units;
   a vehicle height sensor for detecting a distance between said wheels and said vehicle body; and
   control means for outputting a first control signal to increase the damping force by using said changing means when a vibration period of vehicle height detected by said vehicle height sensor falls within a predetermined range with respect to a reference vehicle height as the center of the range and if an amplitude of the vibrations exceeds a first predetermined value, and
   outputting a second control signal to increase the damping force by using said changing means while opening said supply valves for a predetermined time in response to an upward displacement of vehicle height and open said exhaust valves for a predetermined time in response to a downward displacement of vehicle height when the amplitude exceeds a second predetermined value larger than the first predetermined value.

2. An apparatus according to claim 1, further comprising restoration control means for outputting a third control signal for opening required valves of said supply or exhaust valves for a predetermined time so as to set an amount of air in each of said fluid spring chambers to a value prior to the control operation when the vehicle height detected by said vehicle height sensor does not satisfy a condition for outputting the second control signal after the second control signal is output and if the number of supply/exhaust operations of the fluid in each of said fluid spring chambers executed by the second control signal is an odd number.

3. An apparatus according to claim 2, wherein said restoration control means outputs a fourth control signal to said changing means so as to set the damping force of said shock absorber to an initial state when a predetermined time has elapsed after generation of the third control signal.

4. An apparatus according to claim 1, further comprising a vehicle velocity sensor for detecting a vehicle velocity, and wherein said control means inhibits generation of the first and second control signals when a vehicle velocity detected by said vehicle velocity sensor is less than a predetermined value.

* * * * *

UNITED STATES PATENT AND TRADEMARK OFFICE
CERTIFICATE OF CORRECTION

PATENT NO. : 4,856,815
DATED : August 15, 1989
INVENTOR(S) : Tadao Tanaka, et al.

It is certified that error appears in the above-identified patent and that said Letters Patent is hereby corrected as shown below:

Title page, Assignees' names should read

-- Mitsubishi Jidosha Kogyo Kabushiki Kaisha --

-- Mitsubishi Denki Kabushiki Kaisha --

Signed and Sealed this

Seventeenth Day of July, 1990

Attest:

HARRY F. MANBECK, JR.

Attesting Officer

Commissioner of Patents and Trademarks